US 6,577,855 B1

(12) United States Patent
Moore et al.

(10) Patent No.: US 6,577,855 B1
(45) Date of Patent: Jun. 10, 2003

(54) LOW IF RECEIVER

(75) Inventors: Paul A. Moore, Seaford (GB); Michael E. Barnard, Redhill (GB); Astrid Paula Maria Schweer, Nürnberg (DE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/377,357

(22) Filed: Aug. 19, 1999

(30) Foreign Application Priority Data

Aug. 25, 1998 (GB) .............................. 9818397

(51) Int. Cl.[7] ................................ H04B 1/26
(52) U.S. Cl. ........................ 455/324; 455/303
(58) Field of Search ............................. 455/303, 324, 455/255, 257–259, 265, 192.1, 192.2, 302; 348/235

(56) References Cited

U.S. PATENT DOCUMENTS

| | | | |
|---|---|---|---|
| 5,003,621 A | * 3/1991 | Gailus | 455/209 |
| 5,398,080 A | * 3/1995 | Sakashita et al. | 348/735 |
| 5,548,619 A | * 8/1996 | Horiike et al. | 375/344 |
| 5,584,068 A | * 12/1996 | Mohindra | 455/324 |
| 5,715,529 A | * 2/1998 | Kianush et al. | 455/266 |
| 6,148,181 A | * 11/2000 | Otaka | 455/86 |

OTHER PUBLICATIONS

By RF Design, Rod Green & Richard Hosking, "High Performance Direct Conversion" Electronic World, Jan. 1996, pp. 18–22.

* cited by examiner

Primary Examiner—Nguyen T. Vo
Assistant Examiner—Nghi H. Ly

(57) ABSTRACT

A low IF receiver suitable for use in cellular and cordless telephones and TV tuners, comprises input signal receiving means(10), quadrature related frequency down conversion means including first and second mixing means(14, 15) having first inputs(12, 13) coupled to the input signal receiving means and a local oscillator means(16) for generating a local oscillator signal having a frequency offset from a nominal centre frequency of the input signal coupled to second inputs(18, 19) of the first and second mixing means, a channel selectivity polyphase filtering means(20) for selecting a wanted channel signal from outputs of the first and second mixing means, means(26, 28, 30) for detecting when the quality of the frequency down converted signal becomes unacceptable due a large adjacent channel interfering component and means responsive to said detection for changing the local oscillator frequency by at least twice the low IF or one channel bandwidth to displace the large interfering component outside the bandwidth of the channel selectivity polyphase filtering means(20) and simultaneously changing the centre frequency of the polyphase filter.

11 Claims, 4 Drawing Sheets

LOW IF RECEIVER

FIELD OF THE INVENTION

The present invention relates to a low IF receiver, which expression is intended to cover a low IF receiver section of a transceiver. Such a receiver is suitable for fabrication as an integrated circuit for use in telecommunications products, such as cellular and cordless telephones, and TV tuners.

BACKGROUND OF THE INVENTION

Low IF receivers are frequently implemented as polyphase or sequence asymmetric receivers. FIG. 1 of the accompanying drawings illustrates a typical polyphase receiver. A signal received by an antenna 10 is applied to first inputs 12, 13 of quadrature related mixers 14, 15. A local oscillator 16. generating a local oscillator frequency which is offset typically by half a channel spacing from the nominal carrier frequency of the received signal is applied by way of a ninety degree phase shifter 17 to a second input of the mixer 14 and directly to a second input 19 of the mixer 15. The outputs of the mixers 14, 15 are the I and Q channels, respectively. These channels are applied to a polyphase filter 20 functioning as a band pass filter. The outputs of the polyphase filter 20 are applied to respective inputs of a demodulator 22 which provides an output, audio frequency signal on an output terminal 24.

From FIG. 1 it can be seen that the basic polyphase receiver structure is very similar to a zero IF receiver in that the IF consists of a quadrature pair of channels, the in-phase or I channel and the quadrature-phase or Q channel. However, unlike the zero-IF receiver where the local oscillator is run at the centre frequency of the wanted signal, in the polyphase case the low-IF is achieved by running the receiver local oscillator at typically half a channel spacing from the centre frequency of the wanted signal. Thus for example in GSM (Global System for Mobile Communications) with a channel spacing of 200 kHz, if the desired signal is at 950 MHz then the local oscillator could be at 950.1 MHz giving an IF of 100 kHz. The principal advantage of the polyphase approach over the zero-IF approach is that large DC offsets which are unavoidably generated by the two mixers are no longer in the IF bandwidth and therefore do not interfere with the demodulation of the wanted signal.

From the example frequencies given it is obvious that any signal present at 950.2 MHz will form an image signal also at an IF frequency of 100 kHz. In principle this is not a problem since the polyphase filter is able to distinguish signals on its complex inputs having opposing phase relationships, as is the case between the desired and the image frequency. However, this image rejection capability is in practice limited by the level of matching and balance that can be achieved in amplitude and phase between the I and Q channels, which means that an extremely strong signal at the image frequency will cause interference to the desired signal in the IF if the desired signal is too weak. Such a problem does not appear too serious for the DECT and GSM systems because there is a relatively relaxed specification on the adjacent channel rejection required by a receiver. However if the polyphase approach is extended to other systems not having such a relaxed specification on the adjacent channel rejection then image rejection will become more of an issue.

SUMMARY OF THE INVENTION

An object of the present invention is to improve image rejection in low IF receivers.

According to one aspect of the present invention there is provided a low IF receiver comprising frequency down conversion means including a local oscillator, a channel selectivity polyphase filtering means for selecting a wanted channel signal from the output of the frequency down conversion means, means for detecting when the quality of the frequency down converted signal becomes unacceptable and means responsive to said detection for changing the local oscillator frequency and the centre frequency of the polyphase filter.

More particularly the present invention provides a low IF receiver comprising input signal receiving means, quadrature related frequency down conversion means including first and second mixing means having first inputs coupled to the input signal receiving means and second inputs coupled to a local oscillator means for generating a local oscillator signal having a frequency offset from a nominal centre frequency of the input signal, a channel selectivity polyphase filtering means for selecting a wanted channel signal from outputs of the first and second mixing means, means for detecting when the quality of the frequency down converted signal becomes unacceptable and means responsive to said detection for changing the local oscillator frequency and the centre frequency of the polyphase filter.

In one embodiment of the present invention the means for changing the local oscillator frequency also inverts the sign of one of the local oscillator signals. The inversion of one of the local oscillator signals effectively tunes the polyphase filter by twice the IF.

In another embodiment of the present invention the detecting means monitors the potential image frequencies and causes the local oscillator or frequency changing means to change the local oscillator frequency in response to deciding which image frequency to use.

The detecting means may comprise a wideband polyphase filter, means for identifying the frequencies present in the output of the wideband polyphase filter, and image frequency analysing means for providing a control signal for altering the frequency of the local oscillator and the centre frequency of the channel selectivity polyphase filtering means and the wideband polyphase filter.

By being able to simultaneously alter the local oscillator frequency and the centre frequency of channel selectivity filter and other complex signal processing means, such as signal de-rotation rate, it is possible to allow the image frequency to be dynamically steered away from that of any unwanted strong signals. This feature can be used to enhance the performance of inexpensive receivers so that they can meet more stringent type approval requirements or alternatively enable high performance products to be built which would have an on-the-air performance better than that which can be met with conventional superheterodyne and homodyne designs.

According to another aspect of the present invention there is provided an integrated circuit comprising quadrature related frequency down conversion means including first and second mixing means having first inputs for an input signal and second inputs for a local oscillator signal having a frequency offset from a nominal centre frequency of the input signal, a channel selectivity polyphase filtering means for selecting a wanted channel signal from outputs of the first and second mixing means, means for detecting when the quality of the frequency down converted signal becomes unacceptable and means responsive to said detection for providing a control signal for changing the local oscillator frequency and the centre frequency of the polyphase filter.

According to a further aspect of the present invention there is provided a method of operating a low IF receiver, comprising the steps of monitoring the quality of a frequency down-converted signal; if the signal quality is unacceptable, changing the local oscillator frequency by the equivalent of a channel bandwidth; determining if the signal quality is better; and if not, reverting back to the prior local oscillator frequency.

BRIEF DESCRIPTION OF THE DRAWINGS

The present invention will now be described, by way of example, with reference to the accompanying drawings, wherein.

In the drawings the same reference numerals have been used to indicate corresponding features.

DETAILED DESCRIPTION OF THE INVENTION

Figure 1:
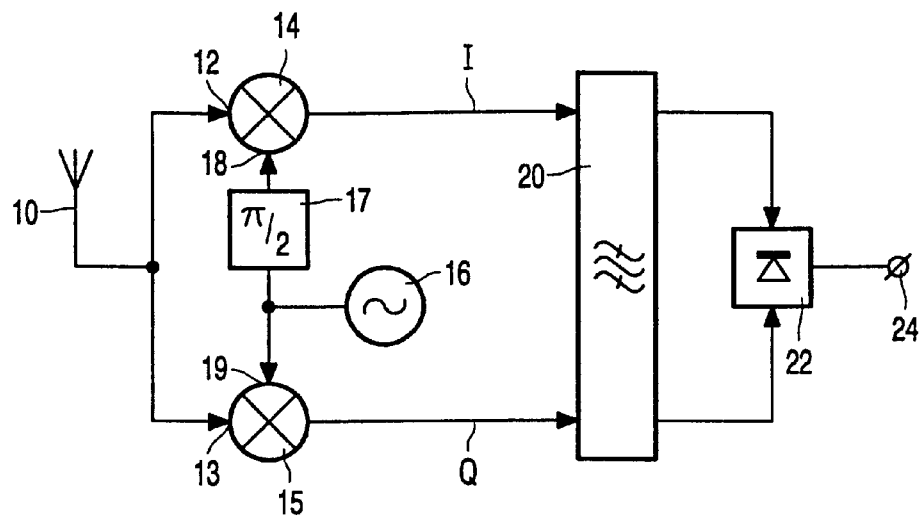
FIG. 1 is a block schematic diagram of the already described zero IF polyphase receiver.
Figure 2:
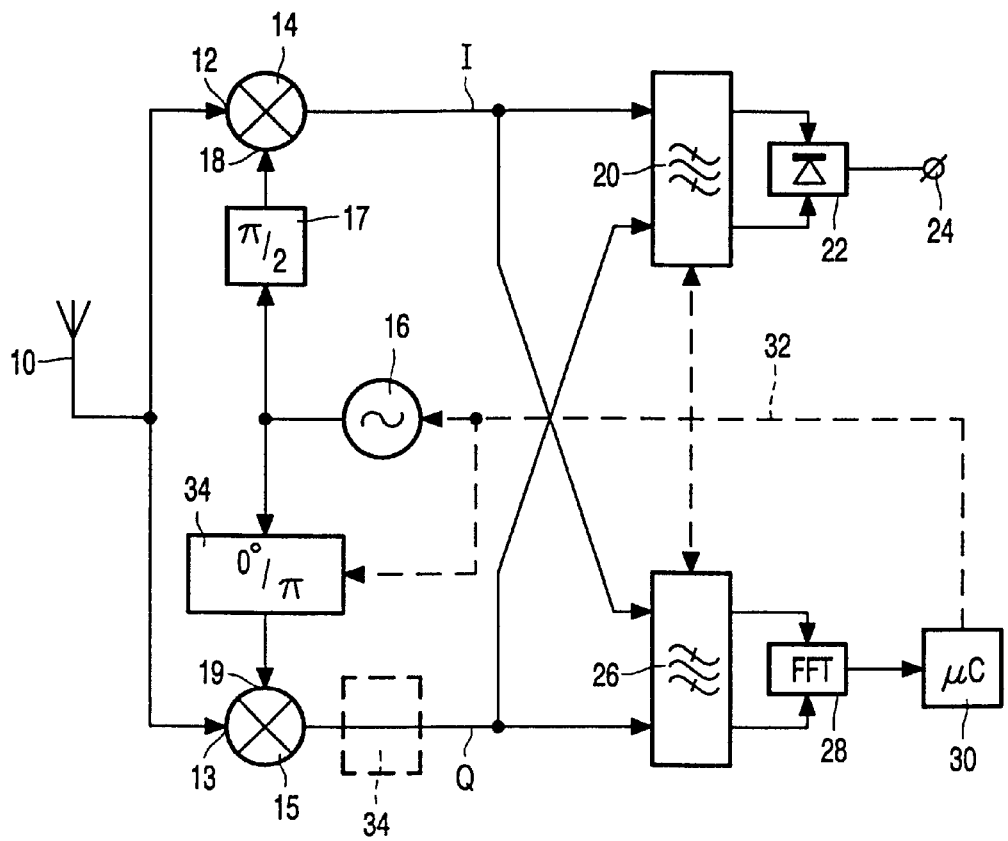
FIG. 2 is a block schematic diagram of one embodiment of a low IF receiver made in accordance with the present invention.

Compared to FIG. 1, the embodiment of the invention shown in FIG. 2 includes additional features, namely a wideband polyphase filter 26, Fast Fourier Transform (FFT) stage 28 and a microcontroller 30, which enable the receiver to monitor potential image frequencies and make an optimal choice at any instant of an IF and the consequent image frequency to use. One method of changing the sign of the IF in one channel, the Q channel, whilst leaving the sign of the other channel, the I channel, unchanged is to invert the phase of the local oscillator 16 output by providing a switchable inverter 34 in the local oscillator path to the input 19 of the mixer 15. An alternative method of changing the sign of the IF in one channel whilst leaving the sign of the other channel, the I channel, unchanged is to locate the inverter 34 in the output path of the mixer 15, as shown in broken lines, thus inverting the Q channel. Optionally the inverter 34 may also be used in the I channel. Digital implementations are also possible. Irrespective of the actual method of changing the sign, this always has the effect of retuning the polyphase filters 20 and 26.

More particularly the I and Q channels are coupled to the polyphase filter 26 which has a bandwidth wide enough to allow through the IF signals corresponding to potential image frequencies, which might extend for instance to three channels either side of the wanted signal. Since there is only a requirement to detect strong signals in this frequency range this filter 26 does not need a very high dynamic range, rather only enough sensitivity to guarantee detecting reliably an image signal that would cause an image rejection problem. This means that the polyphase filter 26 does not require so much resource in terms of silicon area or DSP instruction cycles as does the channel selectivity polyphase filter 20.

Figure 3:
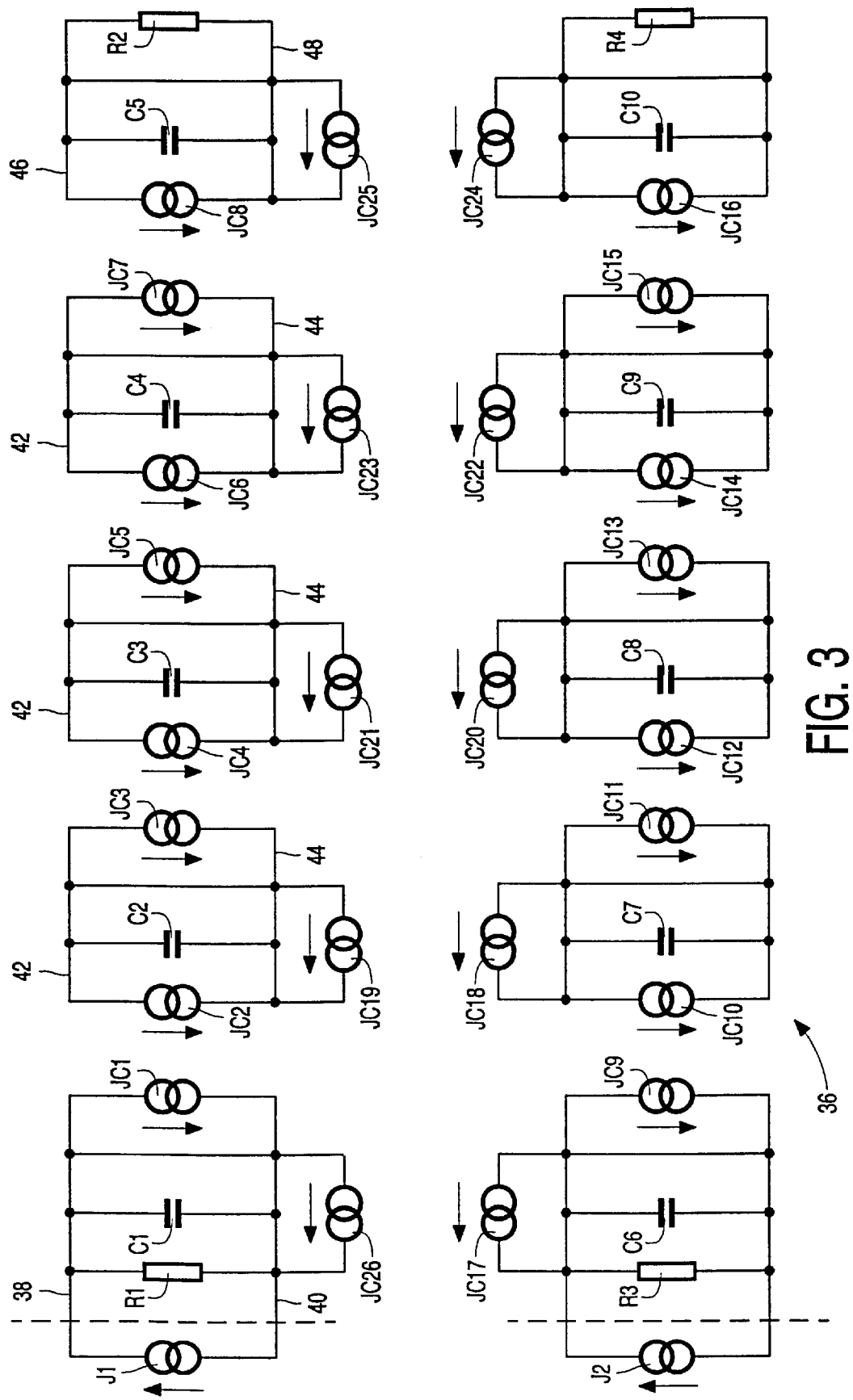
FIG. 3 shows a typical polyphase filter which can be used in the embodiment shown in FIG. 2, FIGS. 4A and 4B illustrate frequency distribution at RF.

FIG. 3 illustrates an embodiment of a 5th order polyphase filter 36 which can be used as filter 20 and/or 26 in FIG. 2. The filter comprises 2 sets of stages, corresponding stages in each set being identical. For convenience of description only one set of the stages will be described and the corresponding components in the non-described set will be shown in parenthesis. A first stage of the filter comprises a source resistor R1 (R3), a capacitor C1 (C6) and a transconductor JC1 (JC9) coupled in parallel between signal rails 38, 40. A cross-coupled gyrator consisting transconductors JC26 and JC17 is coupled to the signal rails 38, 40. A current source J1 (J2) representing the inputs is coupled to the signal rails 38, 40. The current sources J1, J2, correspond to signal inputs from the mixers 14, 15 (FIG. 2).

The second, third and fourth stages are of identical layout and will be described collectively. A transconductor JC2 (JC10), JC4 (JC12), JC6 (JC14) is connected in parallel with a capacitance C2 (C7), C3 (C8), C4 (C9) and another transconductor JC3 (JC11), JC5 (JC13), JC7 (JC15) between signal rails 42, 44. Cross coupled gyrators JC19 (JC18), JC21 (JC20) and JC23 (JC22) are coupled to the signal rails 42, 44 of the respective stages. The fifth stage of the filter comprises a transconductor JC8 (JC16), capacitance C5 (C10) and resistor R2 (R4) connected in parallel between signal lines 46, 48. A cross coupled gyrator JC25 (JC24) is coupled to the signal rails 46, 48. Outputs are derived from the fifth stages. In practice the transconductors JC17 to JC26 are all controlled by a common current control circuit that is adjusted to tune the centre frequency of the filter 36.

Reverting to FIG. 2, the signal from the wideband polyphase filter 26 is applied to the FFT stage 28 which is sufficiently refined as to identify which channels potential interfering signals are located in. Finally the microcontroller 30 analyses the signal strengths present in all of the potential image channels and selects the appropriate IF frequency to minimise potential image breakthrough by controlling the local oscillator 16 frequency and tuning the polyphase filters 20 and 26 to the appropriate centre frequency using signals on a common control line 32.

If there is some latitude in the choice of IF frequency then other considerations, such as the lowest power setting of the receiver, may then also be taken into account in the final IF frequency choice.

The present invention is based on operating the frequency down conversion means, that is the mixers 14, 15 in two alternative modes, one in which the local oscillator frequency $f_{LO}$ is greater than the nominal RF channel frequency $f_{Ch}$, so called supradyne operation and another in which $f_{LO}$ is lower than $f_{Ch}$, so called infradyne operation. In a simple mode of operation the microcontroller 30 switches the local oscillator frequency $f_{LO}$ by twice the IF, that is by $2f_{IF}$, to identify which channels the potential interfering signals are located in.

In order to illustrate the operation of the receiver made in accordance with the present invention reference is made to FIGS. 4A, 4B, 5A, 5B, 6A and 6B.

Figures 4A, 4B:
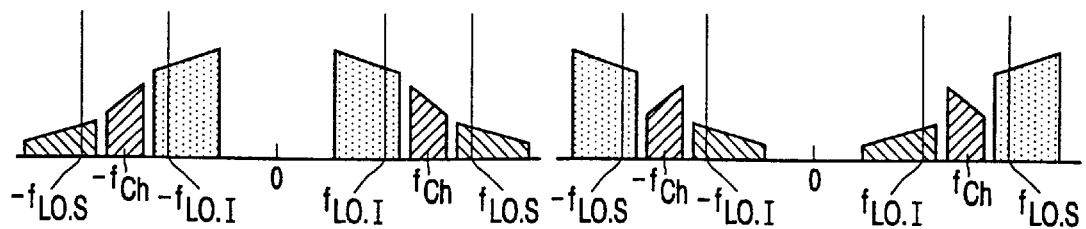

FIGS. 4A and 4B show the frequency distribution at RF with the stronger interfering components being below the wanted channel $f_{Ch}$ in FIG. 4A and above the wanted channel in FIG. 4B. The drawings also indicate the local oscillator frequencies $f_{LO,I}$ and $f_{LO,S}$ and their negative counterparts for infradyne and supradyne operation.

Figures 5A, 5B:
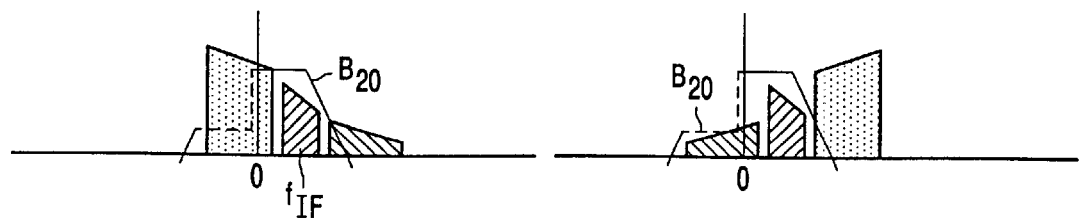
FIGS. 5A and 5B illustrate infradyne operation.

FIGS. 5A and 5B show the frequency distributions at IF after quadrature conversion for infradyne operation. The bandwidth of the channel selectivity polyphase filter 20 is referenced $B_{20}$. The broken line indicates the practically limited rejection on the image side. By comparing FIGS. 5A and 5B it will be noted that in FIG. 5A the larger interfering component lies within the limited image rejection of the filter 20 whereas in FIG. 5B it is the smaller interfering component.

Figures 6A, 6B:
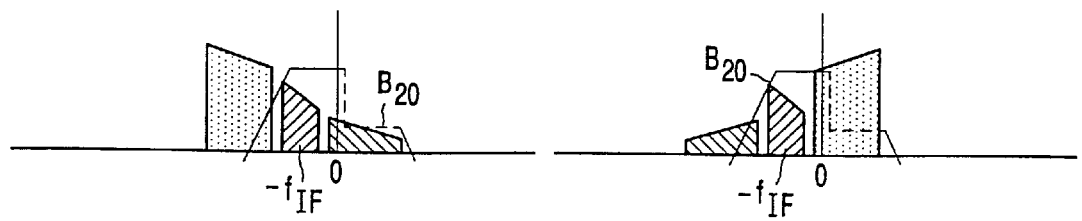
FIGS. 6A and 6B illustrate supradyne operation.

FIGS. 6A and 6B show the frequency distributions at IF after quadrature conversion for supradyne operation. In FIG. 6A, the smaller interfering component lies within the limited bandwidth $B_{20}$ of the filter 20 whereas in FIG. 6B it is the larger component within the limited bandwidth $B_{20}$ of the filter.

By making the bandwidth of the wideband polyphase filter 26 equal to at least 3 channel bandwidths it is possible to determine where a larger interfering component lies and to eliminate it by simply selecting a local oscillator frequency $f_{LO}$ to give infradyne or supradyne operation, and changing the centre frequency of the filter 26 accordingly.

Figure 7:
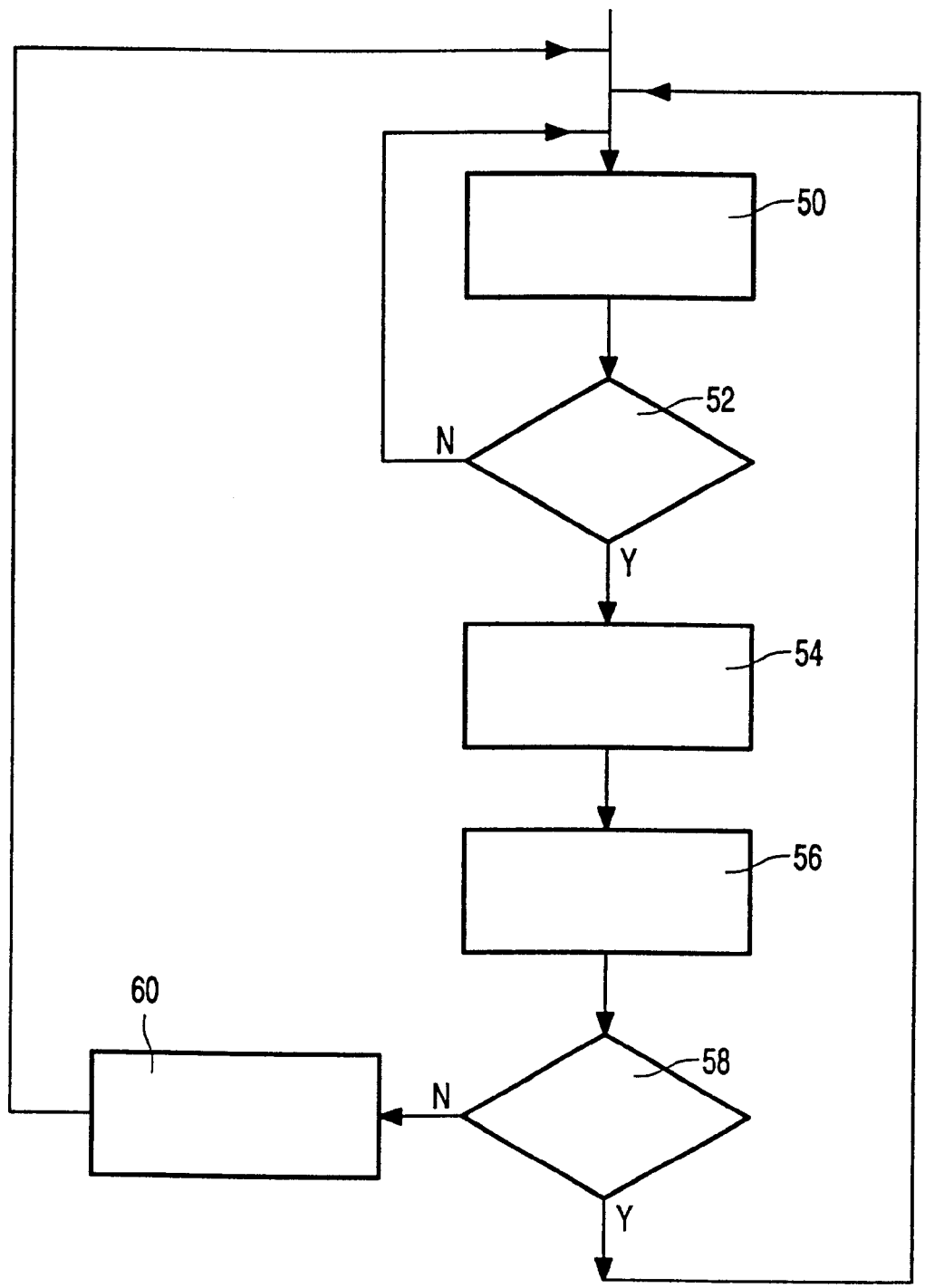
FIG. 7 is a flow chart of an algorithm which effects a change of frequency conversion mode.

FIG. 7 is a flow chart of an algorithm which effects a change of frequency conversion mode in the case of poor quality reception.

Block 50 denotes monitoring signal quality by comparing the signal with a threshold value, for example by considering the bit error rate in a repeatable signal such as a training sequence and/or synchronisation code word, averaged over a predetermined number of bursts or repeats. In block 52 a check is made to see if the measured quality is unacceptable. If the answer is No (N) then the flow chart reverts to the block 50. However if the answer is Yes (Y), then in block 54 the local oscillator frequency is changed by the equivalent of one channel bandwidth, for example 200 kHz in the case of GSM. In block 56 a figure of merit is determined and in block 58 a check is made to see if the reception is better. If the answer is Yes (Y) the flow chart reverts to the block 50. If the answer is No (N), in block 60 the local oscillator frequency is changed back to its original value and the flow chart reverts to the block 50.

In operation the figure of merit of reception should be verified periodically because accumulating changes in operation may lead to the threshold being too small. Using the quality of the previously received signal, the threshold could be increased for a predetermined period.

In situations of failing reception leading to the loss of a call-in-progress and a failed connection, the mode of frequency conversion should be changed.

In the event of finding big interferers before and after shifting the IF by twice the IF frequency and the microcontroller 30 not being able to decide on the better IF, it can as a final option operate the receiver as a zero IF receiver by shifting the IF by one IF and altering the polyphase filter characteristic so that it appears effectively as 2 filters. This may be done by adjusting the cross coupling, that is, between transconductors JC17 and JC26; JC18 and JC19, JC20 and JC21, JC22 and JC23, and JC24 and JC25 so that the currents are zero.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of low IF receivers and component parts thereof and which may be used instead of or in addition to features already described herein.

What is claimed is:

1. A method of operating a low IF receiver, comprising the steps of:

monitoring the quality of a frequency down-converted signal formed by a local oscillator;

if the signal quality is unacceptable, changing a first local oscillator frequency of the local oscillator to a second local oscillator frequency by the equivalent of a channel bandwidth;

determining if the quality of said frequency down-converted signal is better for demodulation by a demodulator; and if not, reverting back to the first local oscillator frequency.

2. The method of claim 1, comprising changing a center frequency of a filter used in filtering the down-converted signal so that said quality becomes acceptable for demodulation by said demodulator.

3. A receiver for receiving a received signal having a received frequency comprising:

a local oscillator which provides a local oscillating signal having a local frequency;

first and second mixers which down-convert said received signal from said received frequency to an intermediate frequency using said local oscillating signal to form first and second signals;

a first filter having a center frequency; said first filter receiving said first and second signals and forming first filtered signals;

a second filter having said center frequency; said second filter receiving said first and second signals and forming second filtered signals;

a demodulator which demodulates said first filtered signals; and a controller which monitors said second filtered signals, and if said second filtered signals have an unacceptable quality, then said controller changes the local oscillating frequency of the local oscillator and the center frequency of at least one of the first filter and the second filter so that said quality of said second filtered signals becomes acceptable for demodulation of said first filtered signals by said demodulator.

4. A receiver for receiving a received signal having a received frequency comprising:

oscillator means for providing a local oscillating signal having a local frequency;

first and second converter means for down-converting said received signal from said received frequency to an intermediate frequency using said local oscillating signal to form first and second signals;

first filter means for filtering said first and second signals to form first filtered signals, said first filter means having a center frequency;

second filter means for filtering said first and second signals to form second filtered signals, said second filter means having said center frequency;

demodulator means for demodulating said first filtered signals; and control means for monitoring said second filtered signals, and if said second filtered signals have an unacceptable quality, then said control means changing the local oscillating frequency of the oscillator means and the center frequency of at least one of the first filter means and the second filter means so that said quality of said second filtered signals becomes acceptable for demodulation of said first filtered signals by said demodulator means.

5. An integrated circuit comprising:

oscillator means for providing a local oscillating signal having a local frequency;

first and second converter means for down-converting a received signal having a received frequency from said received frequency to an intermediate frequency using said local oscillating signal to form first and second signals;

first filter means for filtering said first and second signals to form first filtered signals, said first filter means having a center frequency;

second filter means for filtering said first and second signals to form second filtered signals, said second filter means having said center frequency;

demodulator means for demodulating said first filtered signals; and control means for monitoring said second filtered signals, and if said second filtered signals have an unacceptable quality, then said control means changing the local oscillating frequency of the oscillator means and the center frequency of at least one of the first filter means and the second filter means so that said quality of said second filtered signals becomes acceptable for demodulation of said first filtered signals by said demodulator means.

6. A receiver comprising:

means for monitoring quality of a frequency down-converted signal formed by a local oscillator;

changing means for changing a first local oscillator frequency of the local oscillator to a second local oscillator frequency by the equivalent of a channel bandwidth, if the signal quality is unacceptable; and means for reverting back to the first local oscillator frequency if the quality of said frequency down-converted signal is not better for demodulation by a demodulator.

7. A receiver as claimed in claim 6, wherein said changing means changes the first local oscillator frequency by at least twice a frequency of said frequency down-converted signal.

8. A receiver as claimed in claim 6, wherein the changing means also inverts a sign of a local oscillator signal from said local oscillator.

9. A receiver as claimed in claim 6, wherein said changing means in response to finding that an unacceptable signal is present at both the respective local oscillator frequencies, adapts a polyphase filtering means to operate as two zero IF filters, said polyphase filtering means selecting a wanted signal from said frequency down-converted signal.

10. A receiver as claimed in claim 6, further comprising detecting means for monitoring said quality of said frequency down-converted signal, the detecting means monitoring image frequencies and causing the changing means to change the first local oscillator frequency in response to deciding which image frequency to use.

11. A receiver as claimed in claim 6, further comprising detecting means for monitoring said quality of said frequency down-converted signal; and channel selectivity polyphase filtering means for selecting a wanted signal from said frequency down-converted signal; the detecting means comprising a wideband polyphase filter, means for identifying the frequencies present in the output of the wideband polyphase filter, and image frequency analysing means for providing a control signal for altering the frequency of the local oscillator and the centre frequency of the channel selectivity polyphase filtering means and the wideband polyphase filter.

* * * * *